US006846611B2

(12) United States Patent
Yuzurihara et al.

(10) Patent No.: US 6,846,611 B2
(45) Date of Patent: Jan. 25, 2005

(54) PHASE-CHANGE OPTICAL RECORDING MEDIUM

(75) Inventors: Hajime Yuzurihara, Odawara (JP); Kazunori Ito, Yokohama (JP); Nobuaki Onagi, Yokohama (JP); Masaru Shinkai, Yokohama (JP); Eiko Hibino, Yokohama (JP); Hiroko Ohkura, Sagamihara (JP); Makoto Harigaya, Hiratsuka (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 10/085,692

(22) Filed: Feb. 27, 2002

(65) Prior Publication Data

US 2003/0003395 A1 Jan. 2, 2003

(30) Foreign Application Priority Data

Feb. 28, 2001 (JP) .................................... 2001-054778
Mar. 5, 2001 (JP) .................................... 2001-059441

(51) Int. Cl.[7] .............................................. G11B 7/26
(52) U.S. Cl. ........................ 430/270.13; 430/273.1; 430/945; 369/275.5; 369/275.2; 428/646; 428/645
(58) Field of Search ..................... 430/945, 270.13, 430/273.1; 369/245.2, 285, 275.5; 428/645, 646

(56) References Cited

U.S. PATENT DOCUMENTS 5,484,686 A * 1/1996 Maeda et al. .......... 430/270.13
5,965,229 A * 10/1999 Zhou et al. ................. 428/64.4

FOREIGN PATENT DOCUMENTS

| EP | 475452 | * | 3/1992 |
| EP | 867868 | * | 9/1998 |
| EP | 1058249 | * | 12/2000 |
| JP | 56-130394 | * | 10/1981 |
| JP | 61-122949 | * | 6/1986 |
| JP | 61-180945 | * | 8/1986 |
| JP | 63-098854 | * | 4/1988 |
| JP | 01-258222 | * | 10/1989 |
| JP | 02-252150 | * | 10/1990 |
| JP | 04-032043 | * | 2/1992 |
| JP | 05-217211 | * | 8/1993 |
| JP | 08180458 | | 7/1996 |
| JP | 11-086341 | * | 3/1999 |
| JP | 11-335823 | * | 12/1999 |
| JP | 2000043415 | | 2/2000 |
| JP | 2001034043 | | 2/2001 |

* cited by examiner

Primary Examiner—Martin Angebranndt
(74) Attorney, Agent, or Firm—Cooper & Dunham LLP (57) ABSTRACT

A phase-change optical recording medium capable of implementing record and readout operations of information data through reversible phase transition between amorphous and crystalline states induced by light beam irradiation in a recording layer included in the recording medium, including at least a transparent substrate and contiguous layers formed on the substrate in order as follows, a lower dielectric protective layer, the recording layer, an upper dielectric protective layer, and a reflective/heat dissipating layer, in which the upper dielectric protective layer essentially consists of a mixture of $ZrO_2$ and $SiO_2$, having a composition of $(ZrO_2)_{100-x} (SiO_2)_x$, where $0<x<60$ (mole %).

The phase-change optical recording medium may alternatively include at least a reflective/heat dissipating layer provided contiguously to at least one surface of a recording layer, having a dielectric protective layer interposed between the reflective/heat dissipating layer and the recording layer, in which the recording layer essentially consists of a phase-change recording material having the $Sb_3Te$ metastable phase, the dielectric protective layer consists of a dielectric material containing $ZrO_2$ as a major ingredient, and the reflective/heat dissipating layer consists of Ag, as a major ingredient.

15 Claims, 1 Drawing Sheet

FIG. 1

PHASE-CHANGE OPTICAL RECORDING MEDIUM

BACKGROUND

1. Field

This patent specification relates in general to an optical recording medium, and more particularly to a phase-change recording medium provided with improved dielectric protective layers and reflective layers, feasible for implementing record/readout operations at high recording velocities and attaining desirable overwrite characteristics and storage durability, among others.

2. Discussion of the Background

Optical information recording media have recently come into use as viable information data storage and archival devices of large capacity. With a trend of versatile use of the optical recording media, it is a pressing need to acquire improved capabilities in recording velocity, density and capacity for recording information data.

Of the optical recording devices, a phase-change recording medium is now known capable of implementing repeated record/readout operations by means of laser beam irradiation utilizing phase transition between amorphous and crystalline states. For this type of recording media in particular, overwrite operations can be carried out using a single light beam and a relatively simple optical system for readout steps, which is advantageous over other memory devices.

A phase-change recording medium includes at least a supporting substrate and several contiguous layers formed thereon such as dielectric protective layers, a recording layer, and a reflective layer.

In a phase-change recording medium with such a construction, recorded data bits are formed generally by transforming the portions of the recording layer into the amorphous state, while erasure of the recorded bits is carried out by crystallizing these portions.

With the pressing needs described earlier, there has been achieved a storage capacity of 4.7 GB with a rewritable phase-change recording medium of 120 mm in diameter. With this trend, the capacity on one side of the recording medium may presumably increase to 15 by adopting decreased wavelengths of laser beam from a blue laser device, for example, and using an objective lens with a numerical aperture (NA) of 0.60. The performance of blue laser devices has been improving considerably as a practical light source in the blue wavelength range, assuring high output power at 400 nm, for example.

The trend toward higher data capacity and recording density is thus considered prevalent for phase-change recording media. In implementing high recording speed while still retaining such high density recording, phase-change recording media have to have the capability of achieving repetitive heating, quenching and annealing operations. As a result, it may become increasingly difficult for the recording media to retain high repeatability in overwrite cycles.

In contrast to the current nominal (1×) DVD velocity of 3.5 m/sec, the data recording at a velocity of 10 m/sec or more may be required in the near future, since the phase-change recording media are adopted not only for external memory of computers but also for video applications with the commencement of digital broadcasts, thereby necessitating high speed transfer of large volume of image data.

In order to achieve such high recording speed and high density recording, it is necessary to improve the materials for forming, and the construction of recording media, as well as to improve recording and readout systems and technologies.

A recording material utilized so far is a phase-change type material containing Ag, In, Sb and Te, as major ingredients, thereby achieving a rewritable recording media practically available with a capability of linear readout speed of 3.5 m/sec and a storage capacity of 4.7 GB. This material and media construction is not sufficient from the viewpoint mentioned just above, and further improvements thereof are yet to be made.

For example, the phase-change recording medium generally includes at least a $ZnS$—$SiO_2$ dielectric protective layer, a recording layer containing Ag, In, Sb and Te, as the major components, another $ZnS$—$SiO_2$ dielectric protective layer, and a reflective layer of Al alloys. With the present structure of the recording medium, however, its characteristics are not always satisfactory for achieving data recording at high recording speed and high bit density.

Although Ag metal may be considered as an alternative for its advantage such as, for example, high thermal conductivity, it also has a disadvantage in that it can easily deteriorate disc properties, for example, by sulfide formation with S elements included in the dielectric layer.

In addition, although substitutes for the $ZnS$—$SiO_2$ material may be contemplated, no fully satisfactory replacements have been found so far.

Japanese Laid-Open Patent Application No. 2001-34043 discusses a double-layered structure of the dielectric protective layer, comprising a first layer of $ZnS$—$SiO_2$ formed contiguous to the recording layer and a second layer of SiC formed contiguously to Ag reflective layer, whereby a recording medium has been formed having a large number of repetitive recording cycles. It is noted herein that the SiC material has a thermal conductivity and a melting point both higher than $ZnS$—$SiO_2$, and a small difference in thermal expansion coefficient relative to either $ZnS$—$SiO_2$ dielectric or Ag reflective layer.

Therefore, further improvements are highly desirable in the materials for appropriately forming the recording layers and dielectric protective layers for achieving recording at higher linear recording velocity (e.g., 10 m/sec or larger), and for improved storage durability.

In a phase-change recording medium, as described earlier, data recording is carried out by transforming portions of the recording layer into the amorphous state, while erasure of the bits is carried out by crystallizing these portions. During the step of crystallization (i.e., either initialization or erasure), the recording layer is heated to temperatures higher than its crystallization temperature but lower than melting point, which is followed by annealing at a speed slow enough for crystallization. In addition to the recording material, therefore, the overall structure of the recording medium is important to achieve suitable change in temperature with time in the recording medium.

Suitable materials for forming the dielectric protective layers preferably satisfy several requirements such as being sufficiently transparent in the wavelength range of the laser beam, having high melting, softening and decomposition temperatures, and being easily moldable.

These materials are therefore selected generally among metal oxides and nitrides, having satisfactory heat resistance and mechanical strengths.

The dielectric protective layers formed of such materials generally have large differences in thermal expansion coefficient and elastic modulus relative to the plastic substrate. As a result, the dielectric layer may be peeled from the substrate during repetitive recording and readout operations, thereby forming pinholes and cracks. In addition, the plastic substrate may be warped with relative ease from temperature and humidity.

Thus, there have been investigated a number of materials for forming the dielectric protective layers. Of these materials, the dielectric material such as ZnS, as major ingredient, further including $SiO_2$ and $Y_2O_3$ has been discussed (for example, Japanese Laid-Open Patent Application No. 8-180458), and efforts have been made recently to further improve related materials.

These materials are known to have satisfactory adhesiveness to recording layer materials containing chalcogenide alloy such as GeTeSb, for example, which is advantageous for fabricating recording media.

During the step of transforming to the amorphous state (i.e., recording step), the recording layer is heated to temperatures higher than its melting point, which is followed by quenching, whereby recorded bits are formed. This step is suitably carried out by a heat dissipating layer, which is formed contiguously to the recording layer to also be used as a reflective layer (i.e., reflective/heat dissipating layer).

Examples of materials suitable for forming the reflective layer of optical recording media include Au and Al alloys, which have been in wide use, and Ag alloys which are used rather recently.

Although the Au layer is in use commercially for forming CD Recordable (CD-R) media for its advantageous properties such as, excellent chemical stability, high reflectivity, and thermal conductivity, it also has a disadvantage of relatively high costs.

In contrast, since Al alloys are less expensive and have relatively high reflectivity, they are in wide use for forming several types of optical recording discs such as CD (compact disc) and DVD (digital versatile disc), as well as MO (magneto optical disc) and CD-R (CD-rewritable).

Since the metal Ag has advantages such as reflectivity comparable to, and a thermal conductivity higher than Au, recording media provided with Ag reflective layer can be made. As a result, there may be achieved excellent initial disc characteristics useful for almost all types of optical recording media.

In addition, the Ag metal is less expensive than Au metal, and the velocity for forming Ag layer by sputtering method using Ag sputtering target is about three times higher than that using Al sputtering target.

The Ag metal, however, has several disadvantages such as less chemical stability, for example, thereby causing deterioration in media characteristics. This is caused by the effect of the materials included in neighboring layers, also by humidity infiltrated from the ambient.

As a result, reflectivity of the recording media decreases with time to the extent not to be able to carry out readout steps, and errors increase during readout steps, thereby decreasing overall reliability of the recording media.

In order to alleviate such difficulties, it is known that the Ag metal layer can generally be used in the form of Ag alloys including additives such as, for example, Pd (Palladium) and Rh (Rhodium). However, these additional metals are expensive.

SUMMARY

During experimentation with various dielectric materials for forming protective layers and also the materials for forming reflective layers, it was found that a phase-change recording medium can be provided with materials and layer construction having most, if not all, of the advantages and features of similar employed optical recording media, while eliminating many of the aforementioned disadvantages.

For example, by appropriately selecting recording materials and the materials for dielectric protective layers formed contiguously thereto, a phase-change recording medium can be formed even when the less expensive Ag metal is used as a major ingredient for forming a reflective layer, while achieving satisfactory recording media capabilities such as recording at high linear velocities, improved recording operation cycles, storage durability and overall reliability.

The following brief description is a synopsis of only selected features and attributes of the present disclosure. A more complete description thereof is found below in the section entitled "Description of Preferred Embodiments".

The phase-change optical recording medium disclosed herein is devised to be capable of carrying out record/readout/erase operations of information data through reversible phase transition between amorphous and crystalline states induced by light beam irradiation in a recording layer included in the recording medium. The recording medium includes at least a transparent substrate on which the light beam is incident, and contiguous layers formed on the substrate in order as follows, a lower dielectric protective layer, the recording layer, an upper dielectric protective layer, and a reflective/heat dissipating layer, in which the upper dielectric protective layer essentially consists of a mixture of $ZrO_2$ and $SiO_2$, having a composition of $(ZrO_2)_{100-x} (SiO_2)_x$, where $0<x<60$ (mole %).

In addition, the phase-change optical recording medium is characterized by thermal conductivity of at most 2 W/mK of the upper dielectric protective layer, and operable at a linear velocity of 7 m/sec or more during recording.

Furthermore, the reflective/heat dissipating layer included in the recording medium essentially consists of a material selected from the group consisting of Ag and Ag alloys, and the recording layer essentially consists of Sb and Te, as major ingredients, further consisting of at least three kinds of elements selected from the group consisting of Ag, In, Ge and Ga, having a composition of $X_\alpha Sb_\beta Te_{100-\alpha-\beta}$, with X being at least three kinds of elements above mentioned, where $0<\alpha<15$, and $65<\beta<80$ (atom %).

According to another aspect, the phase-change optical recording medium disclosed herein includes at least a transparent substrate and contiguous layers formed on the substrate in order as follows, a lower dielectric protective layer, the recording layer, a first upper dielectric protective layer, a second upper dielectric protective layer, and a reflective/heat dissipating layer.

The first upper dielectric protective layer essentially consist of a mixture of ZnS, $ZrO_2$ and $SiO_2$, having a composition of $(ZnS)_x(ZrO_2)_y(SiO_2)_{100-x-y}$, where $30<x<70$ and $30<y<70$ (mole %), and the second upper dielectric protective layer essentially consists of SiC.

In addition, the recording layer included in the phase-change optical recording essentially consists of Sb and Te, as major ingredients, further consisting of at least two kinds of elements selected from a group consisting of Ag, In and Ge, having a composition of $X_\alpha Sb_\beta Te_{100-\alpha-\beta}$, with X being at least two kinds of the elements above mentioned, where $0<\alpha<15$, and $60<\beta<80$ (atom %), and the reflective/heat dissipating layer essentially consists of a material selected from the group consisting of Ag and Ag alloys.

According to still another aspect, the phase-change optical recording medium disclosed herein may alternatively include at least a reflective/heat dissipating layer provided contiguously to at least one surface of a recording layer, having a dielectric protective layer interposed between the reflective/heat dissipating layer and the recording layer, in which the recording layer essentially consists of a phase-change recording material having the $Sb_3Te$ metastable phase, the dielectric protective layer essentially consists of a dielectric material containing $ZrO_2$ as a major ingredient, and the reflective/heat dissipating layer essentially consists of Ag, as a major ingredient.

Alternatively, the reflective/heat dissipating layer may essentially consists of Ag—Cu alloys having a compositional ratio of $0.1 \leq Cu/Ag \leq 10$ (mole %).

In addition, the dielectric material containing $ZrO_2$ as a major ingredient is stabilized zirconia, which is selected from the group consisting of (i) $(ZrO_2)_{100-x} (CrO_2)_x$, where $0 \leq x \leq 50$ (mole %), (ii) $(ZrO_2)_{100-x} (Nb_2O_5)_x$, where $0 \leq x \leq 30$ (mole %), (iii) $(ZrO_2)_{100-x} (REO)_x$, where RE designates rare earth, and where $0 \leq x \leq 20$ (mole %), (iv) $(ZrO_2)_{100-x} (MgO)_x$, where $0 \leq x \leq 20$ (mole %), (V) $(ZrO_2)_{100-x} (CaO)_x$, where $0 \leq x \leq 20$ (mole %), (vi) $(ZrO_2)_{100-x} (Y_2O_3)_x$, where $0 \leq x \leq 20$ (mole %), and (vii) $(ZrO_2)_{100-x} (TiO_2)_x$, where $0 \leq x \leq 20$ (mole %).

Furthermore, the phase-change optical recording medium is characterized by the recording layer formed to be interposed between the dielectric protective layers each consisting of one of the above mentioned dielectric materials.

The present disclosure and features and advantages thereof will be more readily apparent from the following detailed description and appended claims when taken with drawing.

DESCRIPTION OF PREFERRED EMBODIMENTS

In the detailed description which follows, specific embodiments of phase-change optical information recording media and methods for providing such recording media are described. It is understood, however, that the present disclosure is not limited to these embodiments, and it is appreciated that the materials, compositions and methods disclosed herein may also be adaptable to any form of information recording medium and system. Other embodiments will be apparent to those skilled in the art upon reading the following description.

In the present disclosure, a phase-change recording medium of primary interest includes at least a recording layer essentially consisting of a phase-change recording material having the $Sb_3Te$ meta-stable phase.

This material is known for its capability of high density recording of the order of equal to, or higher than that of DVD-RAM or DVD-ROM, and a large number of repetitive recording cycles, as discussed in Japanese Laid-Open Patent Application No. 2000-43415. In addition, according to the disclosure, this phase-change material, having a lattice constant of approximately 0.62 nm, is described to have the $Sb_3Te$ metastable phase which belongs to the space group Fm3m.

Furthermore, the metastable phase in the material is also described in the disclosure to be formed by quenching after melt. As a result, in contrast to the recording material of the Sb—Te eutectic composition, this meta-stable material does not undergo a phase separation into Sb and $Sb_2Te_3$.

As a result, no structural disorder at recording mark regions is generated, which is, in turn, caused by the disorder in crystal grain boundary. This crystalline phase therefore essentially facilitates achieving high speed recording.

In the present recording material, the amorphous state during recording period and crystalline state during erase period are both achieved through melting the material. For appropriately forming the $Sb_3Te$ metastable phase of the recording material, therefore, the recording medium is preferably constructed such that its recording layer can first appropriately accumulate heat and then, when subjected to quenching, release the heat.

Figure 1:
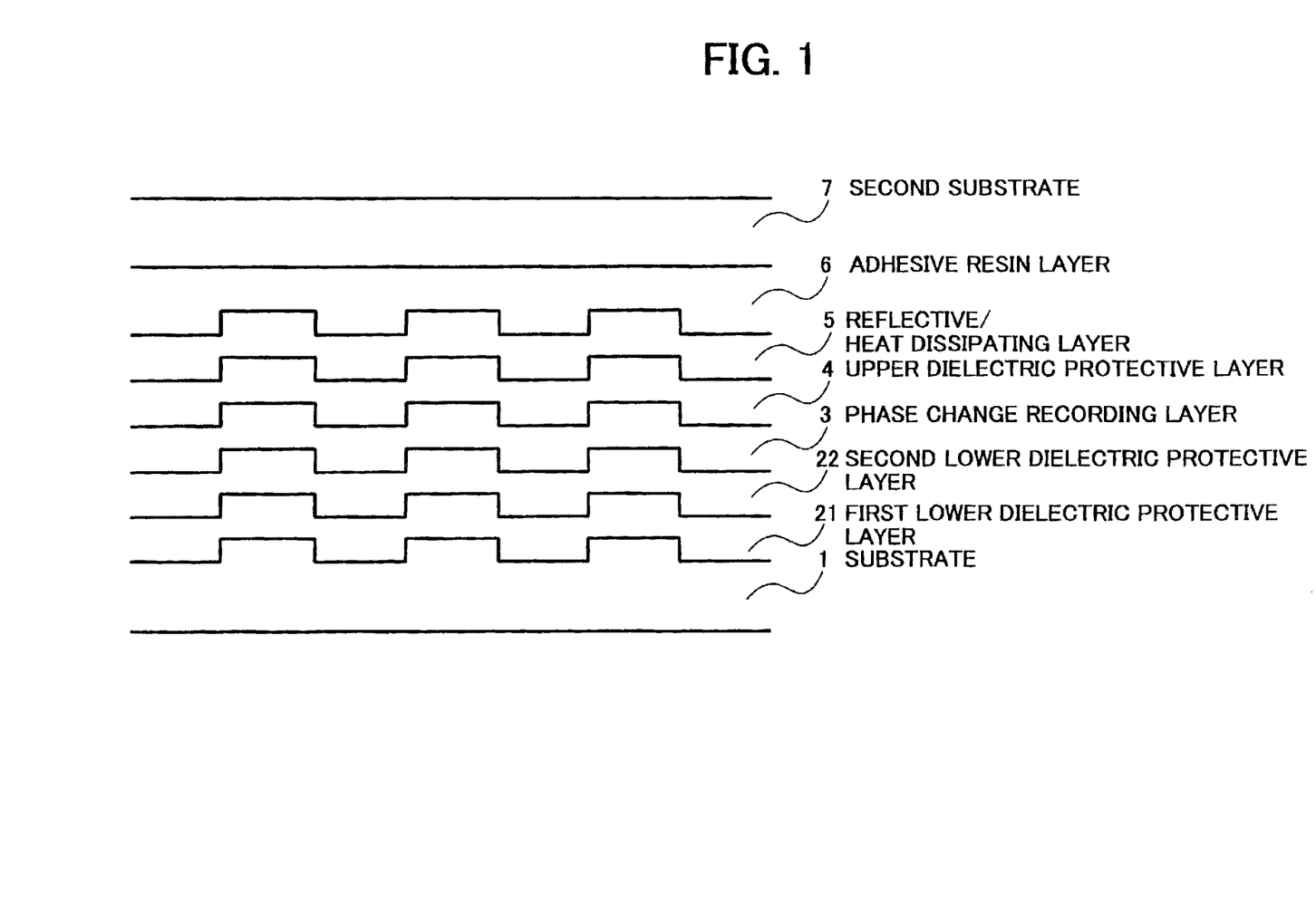
FIG. 1 is a section view illustrating the phase-change optical recording medium according to an embodiment disclosed herein.

FIG. 1 is a section view illustrating a phase-change optical recording medium according to an embodiment disclosed herein.

Referring to FIG. 1, the recording medium includes at least a supporting substrate 1 and the following layers formed contiguously thereon in order as follows: A lower dielectric protective layer 2 (further including a first lower dielectric protective layer 21 and a second lower dielectric protective layer 22), a phase-change recording layer 3, an upper dielectric protective layer 4, a reflective/heat dissipating layer 5, a protective resinous layer 6, and a second adhering supporting substrate 7.

It is noted herein that the above classification of the dielectric protective layers into the first and second ones are solely arbitrary based on their location, and not intended to indicate any hierarchical relation therebetween. Rather intended essentially in the present disclosure is the selection presently made for the phase-change recording medium, including the $Sb_3Te$ meta-stable phase as the material for forming the recording layer 3; dielectric materials having both low thermal conductivity and excellent chemical stability (such as zirconia, for example, which will be detailed later on) as the material for forming the upper dielectric protective layer 4; and the material, containing Ag, as the major component and having high thermal conductivity and excellent chemical stability, for forming the reflective layer 5.

These properties and layer construction are therefore fundamentally unaffected in other application such as, for example, surface recording type phase-change recording layer, in which these layers are formed in the reverse order.

In addition, in place of the second adhering supporting substrate 7, the present (or first) phase-change recording medium may be adhered back to back to a second recording medium, which may be either similar to or different from the first medium, with the protective resinous layer 6 being interposed therebetween.

The lower dielectric protective layer 2, phase-change recording layer 3, and upper dielectric protective layer 4 may be formed by, for example, vacuum evaporation, sputtering, ion plating, and CVD methods. Of these, the sputtering method is preferably utilized for its excellent productivity and properties of those layers formed.

The substrate 1 is provided primarily to support the recording medium and formed of materials preferably sufficiently transparent to light in the wavelength range for use in recording and readout operations of the recording medium.

Suitable materials for forming the substrate 1 thus include glass, ceramics and resinous materials such as polycarbonate, for example. Although the thickness of the substrate is not strictly limited, there generally utilized are 1.2 mm for CD and 0.6 mm for DVD media.

In addition, the substrate 1 may be provided with prefabricated pits or groves to help the disc tracking.

In one aspect, the lower dielectric protective layer 2 is formed primarily consisting of ZnS and $SiO_2$ with a $ZnS:SiO_2$ mixing ratio ranging from 50:50 to 85:15 (mol %). The lower dielectric protective layer 2 has a thickness ranging from 25 nm to 250 nm, and preferably from 45 nm to 90 nm.

The reflective index thereof is 1.5 or more, which is approximately the same as the substrate, and generally ranges from 2.0 to 2.2. As long as the light transparency and reflective index requirements are satisfied, therefore, other oxides, nitrides, or carbides may be used alternatively for forming the lower dielectric protective layer.

During high speed recording steps such as at the velocity exceeding the DVD 2×velocity or 7 m/sec, the mark lengths are decreased. As a result, the temperature in the recording layer has to be raised close to its melting point in short period of time, and then followed by quenching. As a result, there necessitated are large recording powers and the periods of time reduced for both rise and fall of laser light pulses.

Although the recording system included in a record/readout apparatus is designed first to fulfill such requirements, the capability of the system may have limitation including the laser devices having high power and short rise time. Such requirements need to be met both by the recording system and the recording medium.

In one aspect, it is considered possible to achieve high speed recording by selecting materials that are transparent and have a thermal conductivity lower than previously known for $ZnS$—$SiO_2$ material and a small expansion coefficient. As described earlier, the recorded marks are amorphous, while the portions between recorded marks are in the crystalline state.

The thermal conductivity is preferably less than 2 W/mK and reflectivity is approximately 2.0. Thus, $ZrO_2$ is known as a material suitable for achieving high speed recording, having a high melting point. In addition, the thermal conductivity thereof is lowest among oxide materials and is almost unchanged up to the melting point of the recording layer, approximately 600° C., because of small temperature dependence of the thermal conductivity.

With increasing recording density at high linear recording velocities, the temperature in the recording layer becomes more difficult to increase because of concomitant high recording frequency and decreased width of laser pulses. If the width is increased, the formation of the amorphous state becomes more difficult because of reduced period of time for lowering the temperature.

Accordingly, proper data recording is considered to be achieved by reducing the thermal conductivity of the upper protective layer without unduly increasing the laser power.

In addition, the thermal conductivity is preferably as low as possible since sharp increases in temperature are caused in the upper protective layer, as well. This low thermal conductivity is obtained by adding $SiO_2$ to $ZrO_2$. The amount of the $SiO_2$ component is preferably in the range of 0<x<60 (mole %) in $(ZrO_2)_{100-x}(SiO_2)_x$, more preferably in the range of 5<x<15.

Furthermore, the upper protective layer is preferably capable of promoting appropriately the formation of the crystalline phase in the recording layer. As the annealing process becomes more difficult with increasing linear recording velocity, it is preferable for the upper protective layer to be capable of forming more easily the nuclei for promoting the formation of crystallites in the recording layer.

In order to appropriately achieve the nuclei formation, an overlaid reflective layer contains materials with high thermal conductivity such as Ag. With such a layer structure, it becomes feasible for the temperature in the recording layer to be raised quickly, followed by immediate heat dissipation.

The recording layer 3 is formed of phase-change materials. Among the phase-change materials which are capable of changing optical constants by heat applied during recording, thereby forming recorded marks, and which can be erased through melt, the materials of the present disclosure are recording materials related to the $Sb_3Te$ meta-stable phase, having relatively low melting point and high recording sensitivity.

These materials are alloys for practical use in CD-RW media, and are exemplified by, for example, AgInSbTe, GeInSbTe, GeGaSbTe and GeBiInSbTe. In addition, these chalcogenide compounds are known to exhibit reversible change between amorphous as the recorded state and crystalline as the non-recorded state.

Alternatively, for forming the recording medium disclosed herein, which is provided with the aforementioned upper protective layer and reflective layer, suitable recording materials include Sb and Te, as the major components, having a basic crystal structure of the NaCl type either prior to recording or after repetitive recording cycles, and further containing at least three kinds of elements selected from the group consisting of Ag, In, Ge and Ga. Namely, the recording materials have the composition of $X_\alpha Sb_\beta Te_{100-\alpha-\beta}$, with X being at least three kinds of elements selected from the above-mentioned elements, where $0<\alpha<15$, and $55<\beta<80$ (atom %).

Still alternatively, suitable recording materials for forming the recording medium disclosed herein include Sb and Te, as the major components, further containing preferably four kinds of elements, Ag, In, Ge and Ga, and more preferably In, Ge and Ga, with the content (atom %) preferably ranging from 0 to 5 for Ge, from 0 to 3 for Ag, from 0 to 10 for In, and from 0 to 5 for Ga. Too large a content of In and Ge decreases the number of repetitive recording or readout cycles.

The addition of Ga helps increase crystallization velocity, thereby being useful particularly at high linear velocities. In addition, since the Ga addition increases crystallization temperatures, this at least helps suppress deterioration in storage durability of the recording medium.

With such materials and structure of the phase-change recording media as described above, data recording becomes feasible at linear recording velocities as large as 10 m/sec and even 15 m/sec.

Furthermore, by incorporating the abovementioned materials into previously known structure of the recording medium, high recording linear velocity and high recording density become feasible, in which the structure includes at least the following layers which are formed in order as follows, each having optimized thickness: A lower dielectric protective layer having a thickness ranging from 40 nm to 250 nm, a recording layer having a thickness ranging from 5 nm to 100 nm, an upper dielectric protective layer having a thickness ranging from 5 nm to 30 nm, and a reflective/heat dissipating layer having a thickness ranging from 50 nm to 250 nm.

The recording layer has a thickness more preferably ranging from 10 nm to 30 nm. Thickness exceeding 100 nm tends to increase the effects of heat from the ambient during recording steps. As a result, fluctuation in size increases especially for small recorded marks, thereby causing larger signal fluctuation with time and concomitant large signal error rates.

In contrast, for thickness less than 10 nm, the fluctuation in size of recorded marks may increase, which may be caused even by heat of relatively weak readout light beams.

In the earlier selection of the recording materials, there described are the materials and layer structure having rather large crystallization velocity, since the above noted $ZrO_2$—$SiO_2$ dielectric material is less effective than $ZnS$—$SiO_2$ in crystallization acceleration.

Therefore, it is desirable to find a material which has less thermal conductivity, still retaining the same crystallization accelerating capability as $ZnS$—$SiO_2$. The material $ZnS$—$ZrO_2$—$SiO_2$ is thus selected in the present embodiment, having a thermal conductivity of 5 W/mK or less with a composition $(ZnS)_x(ZrO_2)_y(SiO_2)_{100-x-y}$, with $30<x<70$ and $30<y<70$.

In preferable compositional range of $40 \leq x \leq 65$ and $35 \leq y \leq 55$ in the present embodiment, $ZnS$—$ZrO_2$—$SiO_2$ has less thermal conductivity than $ZnS$—$SiO_2$, and has satisfactory capability of crystallization acceleration as well, whereby the upper protective layer can be formed with excellent recording characteristics at high linear recording velocities.

Also in this embodiment, the materials selected for forming the reflective layer are Ag metal or Ag alloys having a thermal conductivity at least comparable to Ag metal.

However, the present Ag containing structure is likely to suffer from the sulfurization under high temperature and humid conditions when the upper protective layer is formed directly under the reflective layer, It is therefore desirable for an additional layer be formed between these upper protective and reflective layers, preferably having a thermal conductivity at least comparable to that of the reflective layer. In addition to the high thermal conductivity, it is also desirable for such a material preferably to have a high melting point, good thermal shock resistance, small thermal expansion coefficient, and small reactivity under high temperature and humid conditions with the upper protective and reflective layers.

SiC is one of the materials to meet the above requirements. This material can be utilized after due consideration of its optical and thermal properties. Namely, since it has a relatively large optical absorption coefficient, the thickness of SiC layer cannot be too large to take full advantage of large reflectivity, and a large thickness thereof decreases its heat dissipation capability. Therefore, the SiC layer thickness suitable for the present embodiment ranges between 2 nm and 10 nm, and more preferably between from 3 nm and 6 nm.

In addition, the material for forming the recording layer suitably used in combination with the above SiC layer includes Sb and Te, as the major components, additionally containing at least two kinds of elements selected from the groups of Ag, In and Ge. Namely, this recording material has the composition of $X_\alpha Sb_\beta Te_{100-\alpha-\beta}$, with X being the above-mentioned elements, where $0<X<15$, and $60<\beta<80$ (atom %).

Thus, this composition contains preferably three kinds of elements, Ag, In and Ge, and more preferably two kinds of elements Ge and In, with the content (atom %) preferably ranging from 0 to 3 for Ag, from 0 to 10 for In, and from 0 to 5 for Ge; and more preferably ranging from 0 to 2 for Ag, from 3 to 7 for In, and from 0 to 3 for Ge.

With the layer construction including these layers, the present recording medium is capable of achieving a linear recording velocity as high as 15 m/sec.

The aforementioned recording material additionally containing four kinds of elements, Ag, In, Ge and Ga, may alternatively be used, in which higher linear velocities become feasible such as DVD 5×velocity. In such a case, the structure includes the following layers, each having optimized thickness: A lower dielectric protective layer having a thickness ranging from 40 nm to 250 nm, a recording layer having a thickness ranging from 10 nm to 30 nm, an upper dielectric protective layer having a thickness ranging from 5 nm to 20 nm, and a reflective/heat dissipating layer having a thickness ranging from 100 nm to 250 nm.

As described earlier, both amorphous state during recording period and crystalline state during erase period in the present recording material are achieved through melting the material. For appropriately forming the $Sb_3Te$ metastable phase of the recording material, therefore, the recording medium is preferably constructed such that its recording layer can accumulate heat and then quench by releasing the heat.

In another aspect of dielectric protective layers disclosed herein, it is preferable for these layers to be able to suppress heat flow over a certain period of time, which is subsequently followed by quenching by releasing the heat quickly. The dielectric layers therefore should have moderately low thermal conductivities.

Accordingly, several materials having a low thermal conductivity comparable to conventional $ZnS$—$SiO_2$ material were investigated.

It is noted herein that thermal conductivity measurements are generally difficult on thin layers such as those conventionally utilized in the recording medium.

Therefore, in place of obtaining the conductivity values themselves, the measurements in present investigation were made on recording sensitivities of various kinds of dielectric materials having a certain fixed layer thickness. As a result, the order of the magnitude of thermal conductivity values was obtained qualitatively rather than directly measuring conductivity values, as indicated just above.

From the results obtained by the measurements it is confirmed that $SiN_x$ and $SiO_2$ each have relatively large thermal conductivities which are not suitable for use in the present recording medium, and that the dielectric materials containing $ZrO_2$ (Zirconium dioxide), as the major component, have lower thermal conductivity values than $ZnS$—$SiO_2$, which are considered suitable in use for forming dielectric protective layers to be incorporated into the phase-change recording medium disclosed herein.

In addition, when the $ZrO_2$ containing dielectric materials are used, it was also confirmed that recorded marks were formed with fewer jitters, which may be due to reduced heat dissipation during recording steps, and that additional advantages such as fewer cross-writes were found, which again may be due to reduced heat blotted to neighboring tracks.

Furthermore, the $ZrO_2$ containing dielectric materials are quite stable chemically, do not cause dissociation of sulfur caused by heat during recording steps, and are not deliquesced by humidity infiltrated from the ambient.

As a result, improved recording characteristics can be achieved such as repetitive rewrite cycling capability and storage durability.

In addition, the dielectric materials containing $ZrO_2$, as the major component, and $Nb_2O_5$, $Y_2O_3$, MgO, CaO, or rare earth oxides added thereto, have been found to have thermal conductivity values which are less than that of $ZrO_2$ alone, and comparable to $ZrO_2$—$CrO_2$. Therefore, these materials are more suitable to use for forming dielectric protective layers to be incorporated into the recording medium disclosed herein.

It was also confirmed, when the $ZrO_2$ containing dielectric materials are used, the aforementioned addition of, for example, expensive Pd metal into the dielectric layers can be deviated, even if Ag containing materials are used in the reflective layer, since the inclusion of S in the dielectric materials is avoided.

Namely, by utilizing the construction of the recording medium disclosed herein without including previously known ZnS—$SiO_2$ dielectric materials in the protective layer, phase-change recording media were able be formed having excellent repetitive recording cycling characteristics.

With the present structure of the phase-change recording media, therefore, the reflective/heat dissipating layer containing Ag, as the major component, is not deteriorated by sulfurization, since S containing ZnS—$SiO_2$ materials need not be included in the dielectric protective layers. As a result, the chemical stability of the reflective/heat dissipating layer was considerably improved.

In regard to materials for forming the reflective/heat dissipating layer, it has been found that the most preferable materials for forming the reflective/heat dissipating layer are Ag—Cu alloys, having several excellent properties, which are comparable to Ag metal, such as high reflectivity, thermal conductivity and sputtering efficiency. In addition, the Ag—Cu alloys are found to have improved corrosion resistance, while retaining the thermal conductivity of Ag metal.

Thus, the Ag—Cu alloys have been found most suitable for forming the reflective/heat dissipating layer to be included in the phase-change recording media. Namely, by adding Cu into Ag, the corrosion resistance of Ag is improved, with no significant reduction of thermal conductivity relative to Ag.

With the present construction of the recording medium, the reflective/heat dissipating layer is formed contiguously to the recording layer at elevated temperatures during recording steps, accompanied by the $ZrO_2$ containing dielectric layer formed therebetween.

Although the effect of the Cu addition on corrosion resistance improvement is not as great as that of Pd or Rh, the inclusion of S elements into the dielectric layer can be avoided with the above-mentioned construction.

Therefore, satisfactory corrosion resistance is achieved for the reflective/heat dissipating layer by selecting Ag—Cu alloys as the material for forming the reflective/heat dissipating layer to be incorporated into the phase-change recording medium disclosed herein including phase-change recording materials in the recording layer, having the $Sb_3Te$ meta-stable phase.

With the materials and layer construction described above, improvements are achieved both in corrosion resistance of the reflective/heat dissipating layer, and in recording capability and reliability in repetitive rewrite cycling for the recording medium.

The Ag—Cu alloys have other advantages such as higher reflectivity than Al alloys, higher sputtering efficiency for layer formation, and lower price than Au, Ag—Pd alloys, or Ag—Rh alloys.

Since the dielectric protective layers are formed to be capable of suppressing heat flow over a certain period of time, to bring the recording layer to melt completely, followed by quenching by releasing heat quickly, fluctuation of mark edge position can be reduced. In addition, since the highest temperatures of the heated recording layer need not so high as in previous structures because of relatively large velocity of quenching, heat damage during rewrite steps can be decreased, thereby further facilitating an increase in the number of repetitive rewrite cycles.

Materials and structure for forming the phase-change recording medium were described herein above. Lower and upper dielectric protective layers are now detailed herein below.

The lower dielectric protective layer 2 is formed in general by a sputtering method. It should be sufficiently transparent to light in the wavelength range for use in recording and readout operations of the recording medium, and should have the capability of preventing penetration of water and gaseous materials from the ambient.

Examples of suitable materials for forming this dielectric protective layer 2 conventionally include ZnS—$SiO_2$ and $TaO_2$, which may be used in the present recording medium as well.

The thickness of the lower dielectric protective layer 2 is not strictly limited, and generally ranges from 40 nm to 250 nm. Conventionally utilized are a thickness ranging from 40 nm to 90 nm for CDs and ranging from 50 nm to 100 nm for DVD media.

The suitable thickness in use for the recording medium is determined with consideration for primarily three concomitant effects such as the confinement of light beams, the suppression of heat flow to the substrate, also preventing water and gaseous materials penetrating into the phase-change recording layer. Therefore, the thickness thereof changes with wavelength of laser light beams used during readout steps.

Although the lower dielectric protective layer 2 can be formed as a single layer made of ZnS—$SiO_2$, the layer may alternatively be formed having a multi-layered structure consisting of two or more sub-layers.

As noted earlier, the recording medium disclosed herein is preferably constructed such that its recording layer can accumulate heat for a certain period of time. Therefore, it is preferable for a thin dielectric layer such as, for example, a $ZrO_2$ layer of about 10 nm thickness as a barrier to be provided contiguously to the phase-change recording layer 3, where relevant.

As an example, the lower dielectric protective layer 2 is provided having a double-layered structure consisting of a first lower dielectric protective layer 21 and a second lower dielectric protective layer 22, as illustrated in FIG. 1, in which the latter serves as the barrier.

Examples of $ZrO_2$ related materials suitable for forming the barrier include the materials for the aforementioned dielectric layer or for the upper dielectric protective layer 4 which will be detailed later.

As the materials for forming the upper dielectric protective layer 4, the aforementioned $ZrO_2$ related materials are suitably selected for their chemical stability and heat insulation capability.

The upper dielectric protective layer 4 is formed having a thickness suitable for heat insulation, which ranges from 10 nm to 100 nm. In addition, this thickness preferably ranges between about 10 nm and 30 nm in order to transfer heat during recording steps from the phase-change recording layer 3 to the reflective/heat dissipating layer 5.

The thickness of the upper dielectric protective layer 4 may further be decreased to the extent of ranging from 5 nm to 10 nm, when recording is carried out by an optical recording system equipped with an optical pickup unit which emits blue laser beams tightly focused by an objective lens of NA=0.8, for example.

The thickness of the upper dielectric protective layer 4 may be increased, when either the recording density or repetitive rewrite capability parameters are relaxed. This may result in increase in recording sensitivity, and also in phase difference readout media which can be operated in such a way as to largely eliminate leftover portions during erasure steps, having large phase difference between recorded and erased portions despite approximately the same reflectivity thereof.

As the materials for forming the reflective/heat dissipating layer 5, the aforementioned Ag based materials are selected in the present recording media, which are Ag—Cu alloys, including from 0.5 to 10 atom % of Cu in Ag. The reflective/heat dissipating layer 5 is generally formed by a sputtering method.

Although a thickness of approximately 50 nm thereof is sufficient from the reflectivity point of view, thickness ranging from 80 nm to 250 nm is preferable for sufficient heat dissipation. Too large a thickness thereof is, however, not preferred because in a practical fabrication process this would increase processing time.

Comparing with pure Ag which has the best properties in reflectivity and heat dissipation, the metal Cu has next best properties. As a result, thermal conductivity of the Ag metal does not decrease unduly with the addition of Cu.

Although various additives such as Al and In are known to improve corrosion resistance of Ag, the change in other properties caused by the addition is of great concern. It has been found that the magnitude of thermal conductivity of the reflective/heat dissipating layer 5 is directly related to the number of repetitive rewrite cycles, and that the latter, the number of cycles, decreases in proportion to the decrease in thermal conductivity.

In comparison with other recording materials consisting of Sb and Te, it should be noted that the above mentioned decrease is evident characteristically for the phase-change recording medium including $Sb_3Te$ based materials in the recording layer, but not for the $Ge_2Sb_2Te_5$ containing recording medium. This is considered to be due to the fact that the crystallization (i.e., erasure) process in the $Ge_2Sb_2Te_5$ containing recording layer proceeds in the solid state, and that slightly lowered crystallization temperature is sufficient for recording process.

In addition, it was also found that the aforementioned additives that can be included to improve corrosion resistance such as Al, In, and Sb, tend to decrease thermal conductivity even when present in an amount of as small as several atom %.

In contrast, the effects of similar decrease as above in thermal conductivity have not been found for the case of Cu addition into Ag—Cu alloys even in larger amount of added Cu.

No previous study is know of the effect of the additives on the detailed change in thermal conductivity of highly thermal conductive material such as the Ag—Cu alloy in particular, although several results have been reported previously on the effects of, for example, Pd or Cu addition on the reflectivity of CD-R recording media.

In addition, it has been found that too much added Cu deteriorates corrosion resistance. Thus, the suitable amount of Cu addition is preferably in the range of from 0.1 atom % to 10 atom %, most preferably from 0.5 atom % to 3 atom %.

The resinous protective layer 6 is preferably formed in a single substrate medium such as CD medium, to protect underlying layers previously formed. In contrast, in DVD medium, the resinous protective layer 6 is formed to serve as an adhesive layer to a second recording medium, as well as the above mentioned protective layer.

This protective layer 6 is formed generally of ultraviolet (UV) curing resin, having a thickness generally ranging from 1 $\mu$m to 10 $\mu$m.

The film formation thereof is carried out by spin coating, spraying, or roll coating method, for example. Of these methods, the spin coating method is preferably utilized for its uniformity of finished films and high production yield. Alternatively, a resin film may be adhered using a roll.

The recording of information data into the phase-change recording medium is carried out by inducing phase transition in the phase-change recording layer 3 by irradiating a light beam for recording, thereby causing a change in optical constants of the recording layer 3. The readout of the information data thus recorded in the recording layer as a difference in optical constants is then carried out by detecting (or reading) a change in reflectivity by irradiating another light beam having a lower intensity than the recording beam.

In regard to the time for forming the reflective/heat dissipating layer 5 having a certain thickness, the present Ag—Cu alloy needs approximately one third of that needed by the conventional Al alloys. This speeds us the manufacturing process, thereby reducing production costs.

Furthermore, the present phase-change recording medium provided with the reflective/heat dissipating layer formed of Ag—Cu alloys disclosed herein has greater corrosion resistance than the recording medium provided with a reflective/heat dissipating layer formed of previously known material such as pure Ag.

As a result of the greater corrosion resistance of the present reflective/heat dissipating layer, among others, overall reliability and storage durability are improved, and the increase in error rates after environmental tests is also reduced for the phase-change recording medium disclosed herein.

Having generally described the present disclosure, the following examples are provided further to illustrate preferred embodiments. This is intended to be illustrative but not to be limiting to the materials, devices or methods described herein.

EXAMPLES

In the following Examples 1 through 4, the formation of several recording phase-change optical information recording media and measurements on their characteristic parameters were carried out with the emphasis primarily on dielectric layers.

In contrast, in the Examples 5 through 12, the fabrication and measurements were carried out with the emphasis on both dielectric layers and reflective/heat dissipation layer.

There are several features in common with the recording media of Examples 1 through 4, in which each of the recording media is formed using a transparent supporting substrate of polycarbonate, having a thickness of approximately 0.6 mm, being provided thereon with constituent layers contiguously formed in order as follows: A lower dielectric protective layer of ZnS:SiO$_2$ (mol ratio of 80:20), a recording layer, an upper dielectric protective layer, and a reflective/heat dissipating layer.

In addition, a layer of an ultraviolet (UV) hardening resinous material is formed on the reflective/heat dissipating layer by hardening with UV light beam irradiation to serve as a protective layer.

Another substrate is then provided, adhered to the protective layer formed previously as above using another UV hardening resinous material as an adhesive agent, to thereby form a recording medium having a thickness of approximately 1.2 mm.

The substrate is provided with grooves to help guide the laser beams, and the depth of the grooves is approximately from 25 nm to 50 nm. In addition, the pitch thereof ranges from 0.3 μm to 0.75 μm, and decreases with decreasing the wavelengths of light beams. In the present examples, the wavelengths for recording and readout are 650 nm using an optical pickup with NA 0.65.

The recording steps are carried out into the groove areas which have a pitch and a width of 0.75 μm and 0.25 μm, respectively.

The irradiation of laser pulses are carried out at four levels of laser beam intensity during the recording steps, that is, laser powers for recording, erasure, readout, and for biasing smaller than the erasure level.

The bias powers are suitably adjusted as follows to form recorded marks (in the amorphous state) more easily: The number of pulses are taken as two for recording 3T marks, since this number is n−1 for forming the shortest marks each having a width of nT (3T in the present case) according to the eight-fourteen modulation (EFM).

In order to prevent smearing at the boundary between recorded and non-recorded portions on the recording layer, or undue erasure caused by crystallization of the amorphous recorded portions, it is important to appropriately adjust these intensity levels of the laser pulses. This is carried out by dividing respective pulses into several portions such as leading, multiple and cooling portions.

The recording frequency used for the recording ranges from 50 MHz to 80 MHz. In addition, the intensity levels of the laser pulses are at most 15 mW for recording power, from five tenths to six tenths of the recording power for the erase, 0.8 mW for the readout, and 0.2 mW for the bias power. Recording linear velocities in either constant linear velocity (CLV) or constant angular velocity (CAV) are adjusted ranging from 7 m/sec to 10 m/sec.

Example 1

A phase-change optical recording medium was formed on a transparent supporting substrate made of polycarbonate.

The following constituent layers were formed on the substrate by magnetron sputtering method in order as follows: A lower dielectric protective layer formed using a sputtering target of ZnS:SiO$_2$=80:20 (mol %) to have a thickness of 75 nm, a recording layer formed using a sputtering target of Ag$_{0.5}$ In$_{3.5}$ Ga$_{2.0}$ Ge$_{2.0}$ Sb$_{69.0}$ Te$_{23.0}$ (atom %), to have a thickness of 18 nm, an upper dielectric protective layer formed using a sputtering target of ZrO$_2$:SiO$_2$=85:15 (mol %) to have a thickness of 12 nm, and a reflective layer formed using a sputtering target of Ag$_{99.5}$ Cu$_{0.5}$ (atom %), to have a thickness of 150 nm.

In addition, a layer of UV hardening resin was disposed thereon, and another substrate (a blank substrate without layer formation) was then adhered to the resin layer, to thereby form a recording medium having a thickness of approximately 1.2 mm.

The thus formed recording medium was subsequently initialized using a laser diode with large beam diameter under predetermined conditions, to thereby crystallize the recording layer.

Record/readout process steps were then carried out into the groove areas using an optical pickup under the following conditions:

λ: 658 nm in laser wavelength,

NA: 0.65, linear recording velocity: 8.5 m/sec, linear recording density: 0.27 μm/bit, recording power: 13.5 mW, erase power: 7.7 mW, and linear readout velocity: 3.5 m/sec.

From the results of the recording and readout steps, the number of repetitive recording cycles was found to be 5000, at which jitters decreased to be 9% or smaller.

In addition, for initially recorded marks after storage at the temperature of 80° C. and relative humidity of 85% for 500 hours, the increase in jitters was found as 1% or smaller.

Example 2

Another phase-change recording medium was fabricated on a transparent supporting substrate of polycarbonate.

The following constituent layers were formed on the substrate by magnetron sputtering method in order as follows: A lower dielectric protective layer formed using a sputtering target of ZnS:SiO$_2$=80:20 (mol %) to have a thickness of 75 nm, a recording layer formed using a sputtering target of In$_{3.0}$ Ga$_{3.0}$ Ge$_{2.0}$ Sb$_{71.0}$ Te$_{21.0}$ (atom %), to have a thickness of 15 nm, an upper dielectric protective layer formed using a sputtering target of ZrO$_2$:SiO$_2$=90:10 (mol %) to have a thickness of 12 nm, and a reflective layer formed using a sputtering target of Ag$_{99.5}$ Cu$_{0.5}$ (atom %), to have a thickness of 150 nm.

In addition, a layer of UV hardening resin was disposed thereon, and another substrate was then adhered to the resin layer, to thereby form a recording medium having a thickness of approximately 1.2 mm.

The thus formed recording medium was then initialized using a laser diode with large beam diameter under predetermined conditions, to thereby crystallize the recording layer.

Subsequently, record/readout process steps were carried out in a similar manner to Example 1, with the exception that a linear recording velocity of 10 m/sec, recording power of 14.5 mW, and erase power of 7.0 mW were adopted for the recording medium.

From the results of the recording and readout steps, the number of repetitive recording cycles was found to be 2000, at which jitters decreased to be 9% or smaller.

In addition, for initially recorded marks after storage at the temperature of 80° C. and relative humidity of 85% for 500 hours, the increase in jitters was found as 1% or smaller.

Example 3

Another phase-change recording medium was fabricated on a transparent supporting substrate of polycarbonate.

The following constituent layers were formed on the substrate by magnetron sputtering method in order as follows: A lower dielectric protective layer formed using a sputtering target of $ZnS:SiO_2=80:20$ (mol %) to have a thickness of 75 nm, a recording layer formed using a sputtering target of $Ag_{0.5} In_{3.5} Ge_{2.0} Sb_{70.0} Te_{22.0}$ (atom %), to have a thickness of 16 nm, an upper dielectric protective layer formed using a sputtering target of $ZnS:ZrO_2:SiO_2=65:35:10$ (mol %) to have a thickness of 10 nm, an additional dielectric protective layer of SiC formed thereon to have a thickness of 4 nm, and a reflective layer formed using a sputtering target of $Ag_{99.5} Cu_{0.5}$ (atom %), to have a thickness of 150 nm.

In addition, a layer of UV hardening resin was disposed thereon, and another substrate was then adhered to the resin layer, to thereby form a recording medium having a thickness of approximately 1.2 mm.

The thus formed recording medium was then initialized using a laser diode with large beam diameter under predetermined conditions, to thereby crystallize the recording layer.

Subsequently, record/readout process steps were carried out in a manner similar to Example 1, with the exception of an erase power of 7.5 mW.

From the results of the recording and readout steps, the number of repetitive recording cycles was found to be 10000, at which jitters decreased to be 9% or smaller.

In addition, for initially recorded marks after storage at the temperature of 80° C. and relative humidity of 85% for 500 hours, the increase in jitters was found 1%.

Example 4

Another recording medium was fabricated on a transparent supporting substrate of polycarbonate.

The following constituent layers were formed on the substrate by magnetron sputtering method in order as follows: A lower dielectric protective layer formed using a sputtering target of $ZnS:SiO_2=80:20$ (mol %) to have a thickness of 75 nm, a recording layer formed using a sputtering target of $In_{6.5} Ge_{2.0} Sb_{70.0} Te_{21.5}$ (atom %), to have a thickness of 15 nm, an upper protective dielectric layer formed using a sputtering target of $ZnS:ZrO_2:SiO_2=50:45:5$ (mol %), to have a thickness of 8 nm, an additional dielectric layer of SiC formed thereon to have a thickness of 4 nm, and a reflective layer formed using a sputtering target of $Ag_{99.5} Cu_{0.5}$ (atom %), to have a thickness of 150 nm.

In addition, a layer of UV hardening resin was disposed thereon, and another substrate was then adhered to the resin layer, to thereby form a recording medium having a thickness of approximately 1.2 mm.

The thus formed recording medium was then initialized using a laser diode with large beam diameter under predetermined conditions, to thereby crystallize the recording layer.

Subsequently, record/readout process steps were carried out in a similar manner to Example 1, with the exception that linear recording velocity of 10 m/sec, recording power of 14.5 mW, and erase power of 8.3 mW were used.

From the results of the recording and readout steps, the number of repetitive recording cycles was found to be 5000, at which jitters decreased to be 9% or smaller.

In addition, for initially recorded marks after storage at the temperature of 80° C. and relative humidity of 85% for 500 hours, the increase in jitters was found as 1%.

Comparative Example 1

A phase-change recording medium was fabricated on a transparent supporting substrate of polycarbonate.

The following constituent layers were formed on the substrate by magnetron sputtering method in order as follows: A lower dielectric protective layer formed using a sputtering target of $ZnS:SiO_2=80:20$ (mol %) to have a thickness of 75 nm, a recording layer formed using a sputtering target of $Ago_{0.5} In_{5.5} Ge_{2.0} Sb_{70.0} Te_{22.0}$ (atom %), to have a thickness of 19 nm, an upper dielectric protective layer formed using a sputtering target of $ZrS:SiO_2=80:20$ (mol %) to have a thickness of 20 nm, and a reflective layer formed using a sputtering target of $Al_{99.0} Cu_{1.0}$ (atom %), to have a thickness of 150 nm.

In addition, a layer of UV hardening resin was disposed thereon, and another substrate was then adhered to the resin layer, to thereby form a recording medium having a thickness of approximately 1.2 mm.

The thus formed recording medium was then initialized using a laser diode with large beam diameter under predetermined conditions, to thereby crystallize the recording layer.

Subsequently, record/readout process steps were carried out in a similar manner to Example 1, with the exception that recording power of 14.5 mW and erase power of 7.5 mW were used.

From the results of the recording and readout steps, the number of repetitive recording cycles was found to be 500, at which jitters decreased to be 9% or less.

In the following Examples 5 through 12, it is noted that compounds such as Y2O3, MgO2, CaO and REOx (RE being rare earth element) are included in zirconium oxides to form 'stabilized zirconia', and the composition and its range for these compounds were herein adjusted in a manner previously known.

In addition, the fabrication and measurements of respective phase-change recording media of the Examples 5 through 12 are carried out as follows, unless otherwise specified.

Each of the recording media is formed using a transparent disk-shaped supporting substrate 1 made of polycarbonate 1, having a thickness of approximately 0.6 mm and a diameter of 120 mm, being provided thereon with pre-grooved spiral having a pitch of 0.74 µm. There formed contiguously thereon are constituent layers such as a lower dielectric protective layer 2, a recording layer 3, an upper dielectric protective layer 4, and a reflective/heat dissipating layer 5, each having a layer composition varied from one example to another.

These layers are deposited by sputtering method using an in-line sputtering apparatus, Model ILC-3105, from ANELVA Co. Ltd., in which the gaseous pressure in the deposition chamber is adjusted to be 2 mm Torr and the composition of sputtering target for forming the reflective layer is prepared in advance to have the same composition as that of the layer.

In addition, a layer of a UV hardening resinous material, SD 301 from Dai-Nihon Ink, Co. Ltd. is disposed on the reflective layer and then hardened by UV light beam irradiation to serve as a protective resin layer 6.

Subsequently, record/readout process steps were carried out with random digital signals modulated by the EFM method using an optical pickup with laser emission of 660 nm in wavelength and 0.65 of NA under the following conditions: Recording density of 0.267 µm/bit, linear recording velocity of 3.5 m/sec, recording peak power of 12 mW, erase power of 6.8 mW, bias power of 0.1 mW, readout power of 0.7 mW, and recording pulses specified by DVD-RW standards for the recording.

Furthermore, storage durability was also measured, in which, following record/readout operations repeated 1000 times on ten recording tracks in the disc area of approximately 30 mm from the center of the disc, and then storing at the temperature of 80° C. and relative humidity of 85% for 500 hours, the change in jitters was measured.

Example 5

A phase-change optical recording medium was formed with the following constituent layers formed on a transparent supporting substrate in order as follows: A first lower dielectric protective layer: ZnS—SiO$_2$, 65 nm in thickness, a second lower dielectric protective layer: $(ZrO_2)_{100-x}$ $(CrO_2)_x$ with x being 0, 10, 20, 30, 40 or 50 in mole %, 5 nm in thickness, a recording layer: Ag$_3$ In$_5$ Sb$_{60}$ Te$_{30}$ Ge$_2$ (atom %), 15 nm in thickness, an upper dielectric protective layer: $(ZrO_2)_{100-x}$ $(CrO_2)_x$ with x being 0, 10, 20, 30, 40 or 50 in mole %, 15 nm in thickness, and a reflective/heat dissipating layer: AgCu alloy with 2 atom % of Cu in Ag, 150 nm in thickness.

These dielectric protective layers were formed by the high frequency sputtering method using sputtering targets of various ZrO$_2$—CrO$_2$ compositions.

A layer of UV hardening resin was disposed thereon, and a clear substrate 7 (without overlaid layer formation) was then adhered to the resin layer with an adhesive sheet, whereby a recording medium (or a recording disc for characteristics evaluation) was fabricated. The total thickness of the resin layer together with adhesive sheet was found as approximately 50 µm.

The thus formed evaluation disc was then initialized for the recording layer to melt and crystallize, and evaluation measurements were subsequently carried out.

The results from the measurements indicate that the recording sensitivity was increased as evidenced by its suitable recording power of approximately 12 mw, which may be compared with 13 mW or more needed for recording media with dielectric protective layers of ZnS—SiO$_2$ alone.

In addition, some of the recording media showed improved jitter values (σ/Tw), such as 6.5% after initial recording, 7.2% after 1000 cycles of record/readout operations, and 9% or less even after 100 thousands cycles of repetitive operations, thereby showing excellent overall rewritable characteristics.

The jitter value was obtained as 8% for the middle three recording tracks out of the aforementioned ten recording tracks after the storage test compared with its initial value of 7.2%. Thus indicates relatively small decrease in deterioration of disc properties. In addition, when the surface of the recording discs was visually observed under lamp illumination, no pinhole was recognized.

With respect to the composition of dielectric layers, a decrease in disc reflectivity was found with the increase in Cr dioxide content due to increase in light absorption. Undue increase in Cr dioxide content is therefore not preferable for recording discs, and the range of its suitable content in x (mole %) was found between 10 and 20. In this range of x, the decrease in reflectivity was found within the tolerance limit of the disc characteristics.

In addition, these disc characteristics were found to give rise to better results in general, when some additional elements were included rather than the ZrO$_2$ component used alone. This is considered due to a possible trend for suppressing the formation of crystalline state, or promoting the amorphous state.

Example 6

A first phase-change optical recording medium was fabricated with the following constituent layers formed on a transparent supporting substrate in order as follows: A first lower dielectric protective layer: ZnS:Nb$_2$O$_5$ (15 wt %), 65 nm in thickness, a second lower dielectric protective layer: $(ZrO_2)_{80}$ $(Nb_2O_5)_{20}$ in mole %, 5 nm in thickness, a recording layer: Ge$_3$ In$_5$ Sb$_{62}$ Te$_{30}$ (atom %), 15 nm in thickness, an upper dielectric protective layer: $(ZrO_2)_{80}$ $(Nb_2O_5)_{20}$ in mole %, 16 nm in thickness, and a reflective/heat dissipating layer: AgCu alloy with 2 atom % of Cu in Ag, 150 nm in thickness.

These dielectric protective layers were formed by the RF sputtering method using a sputtering target having a composition of $(ZrO_2)_{80}$ $(Nb_2O_5)_{20}$ in mole %.

A second recording medium was fabricated in a similar manner as described above. The second recording medium was subsequently adhered to the first recording layer with recording layers back to back with an adhesive sheet, whereby a disc for characteristics evaluation was fabricated. The total thickness of the resin layer together with adhesive sheet was found as approximately 50 µm.

The thus formed evaluation disc was then initialized for the recording layer to melt and crystallize, and evaluation measurements were subsequently carried out.

The results of jitter values (σ/Tw) were obtained from the measurements, such as 6.9% after initial recording, 7.8% after 1000 cycles of record/readout operations.

The jitter value was obtained as 8.2% for the middle three recording tracks out of the aforementioned ten recording tracks after the storage test compared with its initial value of 7.8%, thereby indicating relatively small decrease in deterioration of disc properties. In addition, when the surface of the recording discs was visually observed under lamp illumination, no pinhole was recognized.

In regard to the composition of Nb$_2$O$_5$ in ZrO$_2$, the step-wise increase in the former ranging from 5 mole % to 10 mole % caused a decrease in disc reflectivity due to increase in light absorption. The undue increase in Cr dioxide content is, therefore, not preferable for recording discs, and the range of its suitable content in x (mole %) was found between 5 and 20. In such a range of Nb$_2$O$_5$ content, excellent recording sensitivity was found and the decrease in reflectivity was within the tolerance limit.

Example 7

A first phase-change optical recording medium was fabricated with the following constituent layers formed on a transparent supporting substrate in order as follows: A lower dielectric protective layer: ZnS:SiO$_2$=80:20 (mol %), 75 nm in thickness, a recording layer: Ag$_3$ In$_5$ Sb$_{60}$ Te$_{30}$ Ge$_2$ (atom %), 15 nm in thickness, an upper dielectric protective layer: $(ZrO_2)_{89}$ $(Y_2O_3)_{10}$ in mole %, 15 nm in thickness, and a reflective/heat dissipating layer: AgCu alloy with 2 atom % of Cu in Ag, 150 nm in thickness.

A second recording medium was fabricated in a similar manner as described above. The second recording medium was subsequently adhered to the first recording layer with recording layers back to back with an adhesive sheet, whereby a disc for characteristics evaluation was fabricated.

The total thickness of the resin layer together with adhesive sheet was found as approximately 50 µm.

The thus formed evaluation disc was then initialized for the recording layer to melt and crystallize, and evaluation measurements were subsequently carried out.

The results of jitter values (σ/Tw) were obtained from the measurements, such as 7.0% after initial recording, and 7.6% after 1000 cycles of record/readout operations.

After the storage test, the jitter value was obtained as 8.2% for the middle three recording tracks out of the aforementioned ten recording tracks compared with the initial value of 7.6%, thereby indicating relatively small decrease in deterioration of disc properties. In addition, when the surface of the recording discs was visually observed under lamp illumination, no pinhole was recognized.

In regard to the sputtering target with the composition of $ZrO_2$ and $Y_2O_3$, its sputtering rate was found particularly small. As a result, a prolonged sputtering time due to the low rate may cause undue heating of the recording disc materials and plastic substrate. In order to take full advantage of the $Y_2O_3$ addition disclosed herein, therefore, the $Y_2O_3$ content preferably adjusted to approximately 10 mole %.

Example 8

A first phase-change optical recording medium was fabricated with the following constituent layers formed on a transparent supporting substrate in order as follows: A lower dielectric protective layer: $ZnS:SiO_2=80:20$ in mol %, 75 nm in thickness, a recording layer: $Ag_3 In_5 Sb_{60} Te_{30} Ge_2$ (atom %), 15 nm in thickness, an upper dielectric protective layer: $(ZrO_2)_{90} (MgO)_{10}$ in mole %, 15 nm in thickness, and a reflective/heat dissipating layer: AgCu alloy with 2 atom % of Cu in Ag, 150 nm in thickness.

A second recording medium was fabricated in a similar manner as described above. Subsequently, the second recording medium was adhered to the first recording layer with recording layers back to back with an adhesive sheet, whereby a disc for characteristics evaluation was fabricated. The total thickness of the resin layer together with adhesive sheet was found as approximately 50 µm.

The thus formed evaluation disc was then initialized for the recording layer to melt and crystallize, and evaluation measurements were subsequently carried out.

The results of jitter values were obtained from the measurements, such as 7.5% after initial recording, and 8.2% after 1000 cycles of record/readout operations.

After the storage test, the jitter value was obtained as 8.6% for the middle three recording tracks out of the aforementioned ten recording tracks compared with the initial value of 8.2%, thereby indicating relatively small decrease in deterioration of disc properties. In addition, when the surface of the recording discs was visually observed under lamp illumination, no pinhole was recognized.

Example 9

A first phase-change optical recording medium was fabricated with the following constituent layers formed on a transparent supporting substrate in order as follows: A lower dielectric protective layer: $ZnS:SiO_2=80:20$ in mol %, 75 nm in thickness, a recording layer: $Ag_3 In_5 Sb_{60} Te_{30} Ge_2$ (atom %), 15 nm in thickness, an upper dielectric protective layer: $(ZrO_2)_{90} (CaO)_{10}$ in mole %, 15 nm in thickness, and a reflective/heat dissipating layer: AgCu alloy with 1 atom % of Cu in Ag, 150 nm in thickness.

A second recording medium was fabricated in a similar manner as described above. Subsequently, the second recording medium was adhered to the first recording layer with recording layers back to back with an adhesive sheet, whereby a disc for characteristics evaluation was fabricated. The total thickness of the resin layer together with adhesive sheet was found as approximately 50 µm.

The thus formed evaluation disc was then initialized for the recording layer to melt and crystallize, and evaluation measurements were subsequently carried out.

The results of jitter values were obtained from the measurements, such as 7.3% after initial recording, 7.7% after 1000 cycles of record/readout operations.

After the storage test, the jitter value was obtained as 8.7% in average for the middle three recording tracks out of the aforementioned ten recording tracks compared with the initial value of 7.7%, thereby indicating relatively small decrease in deterioration of disc properties. In addition, when the surface of the recording discs was visually observed under lamp illumination, no pinhole was recognized.

Example 10

Another evaluation disc was fabricated in a similar manner to Example 9 with the exception that an upper dielectric protective layer was formed consisting of $(ZrO_2)_{77} (Y_2O_3)_3 (TiO_2)_{20}$ in mole %, in which the plurality of oxides, $Y_2O_3$ and $TiO_2$, were added to $ZrO_2$.

The results obtained from evaluation measurements indicate that the disc characteristics were satisfactory and that the deterioration of jitters was relatively small. In addition, when the surface of the recording disc, which was s subjected to the storage test, was visually observed under lamp illumination, no pinhole was recognized.

Example 11

Still another evaluation disc was fabricated in a similar manner to Example 5 with the exception that a reflective/heat dissipating layer was formed of pure Ag.

The thus formed evaluation disc was then subjected to several measurements including recording/readout operations and storage test, which were also carried out in a similar manner to Example 5.

The results from the measurements indicate that several disc characteristics were obtained as approximately the same as those of Example 5, such as initial jitters and deterioration after repetitive operation cycles.

For the recording tracks after 1000 cycles of record/readout operations and subsequent storage test, jitters were increased to 9.4%, indicating a greater deterioration than in the case of the AgCu reflective layer of Example 5.

In addition, when the surface of the recording discs was visually observed under lamp illumination, a number of pinholes were recognized all over the surface each having a diameter of several tens of microns.

Example 12

Another evaluation disc was fabricated in a similar manner to Example 5 with the exception that a reflective/heat dissipating layer was formed of AgCu alloy with 40 atom % of Cu in Ag.

The thus formed evaluation disc was then subjected to several measurements including recording/readout operations and storage test, which were also carried out in a similar manner to Example 5.

The results from the measurements indicate that several disc characteristics were obtained as approximately the same as those of Example 5, such as initial jitters and deterioration after repetitive operation cycles.

For the recording tracks after 1000 cycles of record/readout operations and subsequent storage test, jitters were increased to 13%, indicating a greater deterioration than in the case of the reflective layer of Example 5, including AgCu alloy with 2 atom % of Cu in Ag. In addition, a few dropouts of readout signals was detected.

When the surface of the recording discs was visually observed under lamp illumination, no pinhole was recognized.

From the results obtained on the evaluation recording discs of Examples 5, 11 and 12, it has been confirmed that the AgCu alloy, which includes a predetermined amount of Cu, is preferably used as the material for forming the reflective/heat dissipating layer.

Comparative Example 2

Another evaluation disc was fabricated in a similar manner to Example 5 with the exception that an upper dielectric protective layer was formed of ZnS—$SiO_2$ in place of $ZrO_2$—$CrO_2$.

The thus formed evaluation disc was then subjected to several measurements including recording/readout operations and storage test, which were also carried out in a similar manner to Example 5.

The results from the measurements indicate that several disc characteristics were obtained as approximately the same as those of Example 5, such as initial jitters and deterioration after repetitive operation cycles.

For the recording tracks after 1000 cycles of record/readout operations and subsequent storage test, many dropouts of readout signals were detected, thereby causing burst errors.

Although no pinhole was observed visually on the surface of the recording disc under lamp illumination, a number of black dots were recognized under an optical microscope. These black dots presumably consist of Ag sulfides and the abovementioned burst errors may be due to these dots.

It is apparent from the above description including the examples that phase-change recording media having the layered structure disclosed herein are capable of achieving several improved recording characteristics such as high speed and high density recording capability, particularly, of repetitive recording, and storage durability after either initial or repetitive recording.

For example, the phase-change recording media disclosed herein are each fabricated having a layered structure including at least a reflective layer consisting of Ag—Cu alloys, which are formed with excellent characteristics at lower costs than pure Ag previously used, together with an upper dielectric protective layer consisting a sulfur-free dielectric material $ZrO_2$, as the major ingredient.

This is advantageous over previously known media structures which include a reflective layer consisting of Ag—Pd alloys, since the reaction with, and concurrent deterioration of Ag layer caused by sulfur can be prevented. In addition, Cu is available at relatively low costs.

As a result, the phase-change recording media with the present material and layer construction can be placed on the market at lower costs.

In addition, in the recording medium disclosed herein, $Sb_3Te$ based materials are selected for forming a recording layer in combination with the reflective/heat dissipating layer which is endowed with the capabilities such as heat insulation for a predetermined period of time immediately followed by rapid quenching, which are achieved only by the Ag—Cu alloy layer in particular. As a result, excellent jitter characteristics and highly reliable rewritable capabilities become feasible for the phase-change recording medium.

With the recording medium disclosed herein, therefore, overall capabilities of rewritable recording media can be achieved such as recording at higher linear velocities, high recording density, reduced deterioration of recorded data over repetitive record/readout operation cycles.

Although the present disclosure on the phase-change recording medium has been described herein above with reference to the specific embodiments, it is not intended to be limited thereto.

For example, almost the same materials and structure as those presently utilized for forming the rewritable phase-change recording medium may also be adopted for forming write-once type phase-change recording medium. It may be added that the write-once recording medium has more prolonged or semi-permanent data storage capability, since reversibility in recording and readout operations is not required in principle for the write-once medium.

The process steps set forth in the present description on the constituent layer formation and various recording media measurements may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Numerous additional modifications and variations of the embodiments described above are possible in light of the above teachings. It is therefore to be understood that within the scope of the appended claims, the present disclosure may be practiced otherwise than as specifically described herein.

This document claims priority and contains subject matter related to Japanese Patent Applications No. 2001-54778 and 2001-59441, filed with the Japanese Patent Office on Feb. 28, 2001 and Mar. 5, 2001, respectively, the entire contents of which are hereby incorporated by reference.

What is claimed is:

1. A phase-change optical recording medium capable of carrying out record/readout/erase operations of information data through the reversible phase transition between amorphous and crystalline states induced by light beam irradiation in a recording layer included in said recording medium, comprising:

a transparent substrate on which the light beam is incident; and contiguous layers formed on said substrate in order as follows, a lower dielectric protective layer, said recording layer, an upper dielectric protective layer, and a reflective/heat dissipating layer; wherein said upper dielectric protective layer essentially consists of a mixture of ZnS, $ZrO_2$ and $SiO_2$, having a composition of $(ZnS)_x (ZrO_2)_y (SiO_2)_{100-x-y}$, where $30<x<70$ and $30<y<70$ (mole %).

2. The phase-change optical recording medium according to claim 1,
wherein said upper dielectric protective layer has a thermal conductivity of at most 2 W/mK.

3. The phase-change optical recording medium according to claim 1,
wherein said reflective/heat dissipating layer essentially consists of a material selected from the group consisting of Ag and Ag alloys.

4. The phase-change optical recording medium according to claim 1,
wherein said recording layer essentially consists of Sb and Te, as major ingredients, further consisting of at least three kinds of elements selected from a group consisting of Ag, In, Ge and Ga, having a composition of $X_\alpha Sb_\beta Te_{100-\alpha-\beta}$, with X being at least three kinds of elements above mentioned, where $0<\alpha<15$, and $65<\beta80$ (atom %).

5. The phase-change optical recording medium according to claim 1,
wherein said recording medium is operable at a linear velocity of equal to, or larger than 7 m/sec during recording.

6. A phase-change optical recording medium capable of suitably carrying out record/readout/erase operations of information data through the reversible phase transition between amorphous and crystalline states induced by light beam irradiation in a recording layer included in said recording medium, comprising:
a transparent substrate on which the light beam is incident; and
contiguous layers formed on said substrate in order as follows, a lower dielectric protective layer, said recording layer, a first upper dielectric protective layer, a second upper dielectric protective layer, and a reflective/heat dissipating layer; wherein
said first upper dielectric protective layer essentially consisting of a mixture of ZnS, $ZrO_2$ and $SiO_2$, having a composition of $(ZnS)_x (ZrO_2)_y (SiO_2)_{100-x-z}$, where $30<x<70$ and $30<x<y<70$ (mole %).

7. The phase-change optical recording medium according to claim 6,
wherein said second upper dielectric protective layer essentially consists of SiC.

8. The phase-change optical recording medium according to claim 6,
wherein said first upper dielectric protective layer has a thermal conductivity of at most 2 W/mK.

9. The phase-change optical recording medium according to claim 6,
wherein said recording layer essentially consists of Sb and Te, as major ingredients, further consisting of at least two kinds of elements selected from a group consisting of Ag, In and Ge, having a composition of $X_\alpha Sb_\beta Te_{100-\alpha-\beta}$, with X being at least two kinds of elements above mentioned, where $0<\alpha<15$, and $60<\beta<80$ (atom %).

10. The phase-change optical recording medium according to claim 6,
wherein said reflective/heat dissipating layer essentially consists of a material selected from the group consisting of Ag and Ag alloys.

11. The phase-change optical recording medium according to claim 6,
wherein said recording medium is operable at a linear velocity of equal to, or larger than 7 m/sec during recording.

12. A phase-change optical recording medium, comprising:
a reflective/heat dissipating layer provided contiguously to at least one surface of a recording layer, having a dielectric protective layer interposed between said reflective/heat dissipating layer and said recording layer;
wherein said recording layer essentially consists of a phase-change recording material having a $Sb_3Te$ metastable phase, said dielectric protective layer essentially consists of a dielectric material containing $ZrO_2$ as a major ingredient and has a composition of $(ZrO_2)_{100-x} (CrO_2)_x$, where $0 \leq x \leq 50$ (mole %), and said reflective/heat dissipating layer essentially consists of Ag, as a major ingredient.

13. The phase-change optical recording medium according to claim 12,
wherein said dielectric material, which contains $ZrO_2$ as a major ingredient, is stabilized zirconia.

14. The phase-change optical recording medium according to claim 12,
wherein said reflective/heat dissipating layer essentially consisting of Ag—Cu alloys having a compositional ratio of $0.1 \leq Cu/Ag \leq 10$ (mole ratio).

15. The phase-change optical recording medium according to claim 12,
wherein said recording layer is formed to be interposed between said dielectric protective layers each essentially consisting of said dielectric material, which contains $ZrO_2$ as a major ingredient.

* * * * *